United States Patent [19]
Klaus

[11] Patent Number: 5,892,903
[45] Date of Patent: Apr. 6, 1999

[54] METHOD AND APPARATUS FOR DETECTING AND IDENTIFYING SECURITY VULNERABILITIES IN AN OPEN NETWORK COMPUTER COMMUNICATION SYSTEM

[75] Inventor: Christopher W. Klaus, Atlanta, Ga.

[73] Assignee: Internet Security Systems, Inc., Atlanta, Ga.

[21] Appl. No.: 710,162

[22] Filed: Sep. 12, 1996

[51] Int. Cl.[6] .................................................. G06F 11/00
[52] U.S. Cl. ............................... 395/187.01; 395/200.57
[58] Field of Search .............................. 395/187.01, 186, 395/188.01, 200.59, 200.57, 183.04, 200.67, 200.68

[56] References Cited

U.S. PATENT DOCUMENTS

| | | | |
|---|---|---|---|
| 4,223,380 | 9/1980 | Antonaccio et al. | 364/200 |
| 5,204,966 | 4/1993 | Wittenberg et al. | 395/188.01 |
| 5,309,562 | 5/1994 | Li | 395/200 |
| 5,311,593 | 5/1994 | Carmi | 380/23 |
| 5,347,450 | 9/1994 | Nugent | 395/200 |
| 5,371,852 | 12/1994 | Attanasio et al. | 395/200 |
| 5,515,508 | 5/1996 | Pettus et al. | 395/200.01 |
| 5,557,742 | 9/1996 | Smaha et al. | 395/186 |
| 5,623,601 | 4/1997 | Vu | 395/187.01 |

OTHER PUBLICATIONS

Guha et al., "Network Security via Reverse Engineering of TCP Code: Vulnerability Analysis and Proposeed Solutions", IEEE, pp. 603–610, Mar. 1996.

Garg et al., "High Level Communication Primitives for Concurrent Systems", IEEE, pp. 92–99, 1988.

Hastings et al., "TCP/IP Spoofing Fundamentals", IEEE, pp. 218–224, May 1996.

Snapp, "Signature Analysis and Communication Issues in a Distributed Intrusion Detection System", Master Thesis; University of California, Davis, CA, pp. 1–40, 1991.

Guha et al., "Network Security via Reverse Engineering of TCP Code: Vulnerability Analysis and Proposed Solutions", IEEE, pp. 40–48, Jul. 1997.

Djahandari et al., "An MBone Proxy for an Application Gateway Firewall", IEEE, pp. 72–81, Nov. 1997.

Kim et al., "Implementing a Secure rlogin Environment: A Case Study of Using a Secure Network Layer Protocol", Department of Computer Science, University of Arizona, pp. 1–9, Jun. 1995.

Satyanarayanan, "Integrating Security in a Large Distributed System", Acm Transactions on Computer Systems, vol. 7, No. 3, pp. 47–280, Aug. 1989.

*Primary Examiner*—Albert Decady
*Assistant Examiner*—Scott T. Badesman
*Attorney, Agent, or Firm*—Morris, Manning & Martin, L.L.P.

[57] ABSTRACT

A system and method is disclosed for detecting security vulnerabilities in a computer network. The system includes an IP spoofing attack detector, a stealth port service map generator, a source port verifier, source routing verifier, an RPC service detector and a Socks configuration verifier. Each of these verifiers may be operated separately or as a group to detect security vulnerabilities on a network. Each verifier may be programmed to exhaustively test all ports of all computers on a network to detect susceptibility to IP spoofing attacks, access to services with little or no authorization checks or misconfigured routers or Socks servers. The detected vulnerabilities or the location of services having little or no authorization checks may be stored in a table for reference by a network administrator. The service map generated by the stealth service map generator may be used to identify all service ports on a network to facilitate the operation of the other verifiers which send service command messages to service ports to detect their accessibility. A graphic user interface (GUI) may be used to provide input and control by a user to the security verifiers and to present options and display information to the user.

41 Claims, 8 Drawing Sheets

METHOD AND APPARATUS FOR DETECTING AND IDENTIFYING SECURITY VULNERABILITIES IN AN OPEN NETWORK COMPUTER COMMUNICATION SYSTEM

FIELD OF THE INVENTION

This invention relates to network communications for computers, and, more particularly, to computer communications over open networks.

BACKGROUND OF THE INVENTION

Many business and scientific organizations in the United States which use more than one computer in their operations couple the computers together through a network. The network permits the computers to be islands of processing which may share resources or data through communication over the network. The data which may be communicated over the network may take the form of programs developed on a user's computer, data files created on a user's computer, electronic mail messages and other data messages and files which may be generated or modified by a user at a user's computer. Typically, the user's computer includes an operating system for controlling the resources of the user's computer, including its central processing unit ("CPU"), memory (both volatile and non-volatile memory) and computer peripherals such as printers, modems and other known computer peripheral devices. The user typically executes application programs and system services to generate data files or programs.

Most computers are coupled to a network through a network communication printed circuit card which is typically resident within each computer system. This communication card typically includes processors, programs and memory to provide the electrical signals for transmission of data and implement the protocol which standardizes the messages transmitted through a network. To communicate data from a user's application program or operating system service, a protocol stack is typically implemented between the communication card for the network and the operating system services and application programs.

The typical protocol stack used on most open networks is a Transport Control Protocol/Internet Protocol ("TCP/IP"). This protocol stack includes a transport layer which divides a data stream from an application program or service into segments and which adds a header with a sequence number for each segment. The TCP segments generated by the transport layer are passed to the Internet Protocol ("IP") layer. The IP layer creates a packet having a packet header and a data portion. The data portion contains the TCP segment and the packet header contains a source address identifying the computer sending a message and a destination address identifying the computer for which the message is intended. The IP layer also determines the physical address of the destination computer or an intermediate computer, in some cases, which is intended to receive the transmitted message. The packet and the physical addresses are passed to a datalink layer. The datalink layer typically is part of the program implemented by a processor on the communication card and it encapsulates the packet from the IP layer in a datalink frame which is then transmitted by the hardware of the communication card. This datalink frame is typically called a packet. For purposes of this specification, the word "message" includes the data entities packet and datalink frame.

At the destination computer, the communication card implements the electrical specification of a hardware communication standard, such as Ethernet, and captures a data message from a source computer. The datalink layer at the destination computer discards the datalink header and passes the encapsulated packet to the IP layer at the destination computer. The IP layer at the destination computer verifies that the packet was properly transmitted, usually by verifying a checksum for the packet. The IP layer then passes the encapsulated TCP segment to the transport layer at the destination computer. The transport layer verifies the checksum of the TCP message segment and the sequence number for the TCP packet. If the checksum and TCP sequence number are correct, data from the segment is passed to an application program or service at the destination computer.

Segregation of communication functions in the various layers of the protocol stack and the segregation of the protocol stack from the communication card and application programs, modularizes the functions required to implement communication over a computer network. This modularization of functions simplifies computer communication operation and maintenance. It also does not require a user to have knowledge of how the protocol stack and communication card communicate in order to send data messages to other computers over the network.

All of the computers coupled to a network may have approximately the same resources available at each machine. The type of network is sometimes called a peer to peer network. Another type of network environment is one in which one computer controls shared databases and other computer resources with other computers over the network. The computer controlling access to the shared resources is typically called a server and the computers utilizing the shared resources are called clients.

In both the client/server and peer to peer environments, a server or computer may be used as a gateway to other networks or computers. Another device which a message may encountered as it moves along a network is a router. A router examines destination addresses of messages it receives and routes them in an efficient manner to the specified destination computer. For example, a server on a first network may be coupled to a router which is coupled to a plurality of servers including a server on a second network and a server for a third network. In this type of environment, the computer on the first network may communicate with a computer on the third network by generating data messages which have the destination address for a computer on the third network. The message circulates through the first network and is eventually provided to the server of the first network. The server of the first network then passes the message to the router which determines that the message is addressed for the third network. Accordingly, it sends the message to the server of the third network. The communication facilities at the server for the third network recognize the destination address as existing on the third network and pass the message to a computer on the third network where it eventually would be passed to the destination computer.

While this type of communication effectively and efficiently couples all of the computers from all of the networks together without requiring a message to pass through each computer on the network, a message typically passes through a number of computers, routers, servers or gateways prior to reaching the destination computer. As a result, the data messages from one computer to another computer may be intercepted and data obtained from the message as the message is passed on to another computer. The type of network wherein this type of accessible communication is provided is typically called an open network. One of the more popularly known open networks is the Internet where literally millions of servers and computers are coupled through a TCP/IP communication protocol.

While the open network architecture of the Internet permits a user on a network to have access to information on many different computers, it also provides access to messages generated by a user's computer and to the resources of the user's computer. In fact, there are persons who attempt to use knowledge regarding the operations of the protocol stack and operating systems in an effort to gain access to computers without authorization. These persons are typically called "hackers". Hackers present a significant security risk to any computer coupled to a network where a user for one computer may attempt to gain unauthorized access to resources on another computer of the network. For example, an employee may attempt to gain access to private and confidential employee records on a computer used by the human resources department of an employer.

In an effort to control access to a network and, hence, limit unauthorized access to computer resources available on that network, a number of computer communication security devices and techniques have been developed. One type of device which is used to control the transfer of data is typically called a "firewall". Firewalls are routers which use a set of rules to determine whether a data message should be permitted to pass into or out of a network before determining an efficient route for the message if the rules permit further transmission of the message. In this specification the term "routers" includes firewalls and routers.

In the TCP/IP protocol, a communication connection is established through a three handshake open network protocol. The first handshake or data message is from a source computer and is typically called a "synchronization" or "sync" message. In response to a sync message, the destination computer transmits a synchronization-acknowledgment ("sync-ack") message. The source computer then transmits an acknowledgment ("ack") message and a communication connection between the source and destination computer is established. To limit access to computers on a network, routers may be provided as a gateway to the network and programmed to detect and block sync messages being transmitted from a computer external to the network to a destination computer on the network. That is, computers on the network may send out sync messages through the router to initiate communication with other computers, but computers outside the router and its network cannot send sync messages through the router to initiate communication with computers on the network. In this way, a hacker cannot attempt to initiate communication with a computer on the network.

Hackers, however, have developed other ways which may be helpful in bypassing the screening function of a router. For example, one computer, such as a server on the network, may be permitted to receive sync messages from a computer outside the network. In an effort to get a message to another computer on a network, a hacker may attempt to use source routing to send a message from the server to another computer on the network. Source routing is a technique by which a source computer may specify an intermediate computer on the path for a message to be transmitted to a destination computer. In this way, the hacker may be able to establish a communication connection with a server through a router and thereafter send a message to another computer on the network by specifying the server as an intermediate computer for the message to the other computer.

In an effort to prevent source routing techniques from being used by hackers, some routers may be configured to intercept and discard all source routed messages to a network. For a router configured with source routing blocking, the router may have a set of rules for inbound messages, a set of rules for outbound messages and a set of rules for source routing messages. When a message which originated from outside the network is received by such a router, the router determines if it is a source routed message. If it is, the router blocks the message if the source routing blocking rule is activated. If blocking is not activated, it allows the source routed message through to the network. If the message is not a source routed message, the router evaluates the parameters of the message in view of the rules for receiving messages from sources external to the network. One such rule is the external sync message filter discussed above. Other rules may also be implemented in such a router. However, a router vulnerability exists where the rules used by the router are only compared to messages that are not source routed and the source routed blocking rule is not activated. In this situation, the router permits source routed messages through without comparing them to the filtering rules. In such a case, a computer external of the network may be able to bypass the external sync message filter and establish a communication connection with a computer on the network by using source routed messages.

What is needed is a system and method for verifying that the source routing blocking feature of a router has been activated.

Networks may also be coupled to external computers through a specialized communication filter typically known as a "Socks" proxy server. A Socks proxy server is interposed between a network and external computers. For an external computer to establish communication with a computer on a network coupled to a Socks server, the external computer first establishes a communication connection with the Socks server and the Socks server establishes a communication connection with the destination computer. Thereafter, the Socks server relays messages between the external computer and a computer on the network only if they comply with the filter rules configured for the Socks server. Typically, Socks servers are used to interface e-mail, File Transfer Protocol ("FTP") and Telnet communication services between computers on a network and computers external of the network and to block access to most other ports on a network. The interrogation and evaluation of messages through a Socks server is dependent upon the network administrator for proper configuration. Known methods for verifying the configuration of the Socks server is to view the configuration files of the Socks server to verify the rules are properly set. However, this method does not ascertain the rules actually being implemented by the Socks server.

What is needed is a method and system for determining the rules being implemented by a Socks server without reviewing the configuration files for a Socks server.

Another entry port for hackers are commonly known services which provide information to external users without requiring authorization checks such as passwords. Most implementations of the UNIX operating system, for example, include Remote Procedure Call (RPC) services which may not be protected by authorization checks. The ports on which RPC services are located may be determined by querying a UNIX operating system service known as "portmapper". In an effort to obtain knowledge regarding accessible services on a computer, a hacker may make an inquiry of the portmapper service at its port in order to obtain information regarding the RPC services available for entry on the computer. Although the portmapper service may be reconfigured to include an authorization check that still does not provide an authorization check for the RPC services themselves.

What is needed is a system and method for detecting and reporting to a network administrator those ports which are coupled to RPC services which have little or no authorization checks.

As discussed above, the transport layer of the protocol stack provides a sequence number for each data segment to be transmitted. In the TCP/IP protocol, the sequence number is called a TCP sequence number which is placed in the TCP header generated by the transport layer. The sequence number for the data segment is typically incremented at predefined time units, for example, each second, and for each communication connection or attempted communication connection. For example, in attempting to establish communication with another computer on a TCP/IP network, the source computer generates a sync message with a TCP sequence number. The destination computer responds with a sync/ack message where the ack value in the message is the sequence number from the received sync message and the sequence number for the destination computer is a number generated by the destination computer. This sequence number typically has the value of the last TCP sequence number generated by the destination computer plus the addition of a preferred offset value for each predefined time unit and communication connection that has occurred since the last TCP sequence number was generated. The ack message from the source computer to the destination computer which completes the communication connection must include the TCP sequence number received from the destination computer in the sync/ack message.

One known way which hackers attempt to access a computer on a network is to emulate the communication of messages from another computer on the network. A hacker emulates another computer on the network by first blocking a communication port on the computer being emulated by repeatedly sending sync messages to a port on the computer. This causes the communication program for the port to fill its communication buffer with half-open communication connections. When the buffer is full, no more sync messages are accepted until the oldest attempted half-open communication connection times out. Typically, the time out period is ten minutes or longer. In order to obtain a sequence number, the hacker's computer sends a number of sync messages to the computer which is the target of the attack which responds with a plurality of sync/ack messages containing TCP sequence numbers to the hacker's computer. The TCP sequence numbers from the sync/ack messages may be compared to statistically determine the offset used by the target computer to generate TCP sequence numbers. The hacker then uses the emulated computer's blocked port address as the source computer address for a sync message originated by the hacker's computer. In response, the target computer replies with a sync/ack message which is addressed to the blocked computer port of the emulated computer. Thus, the hacker's computer does not receive the sync/ack message with the TCP sequence number required for a proper response. However, the hacker's computer then sends an ack message with the next computed sequence number derived from bombarding the target computer with sync messages. If the sequence number has been correctly computed so that it matches the sequence number in the sync/ack message sent by the target computer to the blocked computer port, a communication connection is established and the hacker is able to transmit a command to the service on the port of the target computer through which communication has been established. In a UNIX system, a hacker normally attacks the ports coupled to the rsh and rlogin services since the authorization check for these services is usually the source address. If the hacker is able to successfully emulate a computer on the network having an address authorized for the service on the target computer port, the command is executed by the service. The service command typically provided to the port of the target computer disrupts the target computer's operation so the hacker's computer has unencumbered access to the target computer's resources. These types of attacks which use predicted TCP sequence numbers are typically known as IP spoofing attacks.

Although the protocol stack for each computer uses different offset values to generate the initial TCP sequence number for establishing communication links, some machines generate initial sequence numbers which are more easily predicted than others. What is needed is a way of detecting which computers on a network are susceptible to attacks using predicted TCP sequence numbers.

SUMMARY OF THE INVENTION

The above-noted vulnerabilities of a computer network may be automatically detected by a computer program which implements the system and method of the present invention. One embodiment of the present invention includes an Internet protocol ("IP") spoofing attack generator for generating an IP spoofing attack directed to a target computer and a service command message generator for sending a command to be executed by a service coupled to a port on the target computer so that in response to the target computer being compromised by the IP spoofing attack the target computer generates a compromise indicator without altering or destroying the target computer's services and/or operations. Preferably, the target computer response is an electronic mail message or a Telnet initiation message. Preferably, the IP spoofing attack is directed against a port coupled to the rsh or rlogin services. Preferably, the embodiment includes a source/destination address generator which generates source and destination addresses for messages corresponding to an open network protocol. The destination addresses correspond to the target computer and the source addresses correspond to the emulated computer in the IP spoofing attack. The source/destination address generator generates the address for each computer on a network so that an IP spoofing attack from every computer on the network is directed against each of the other computers on the network. In this manner, those computers on the network which are most susceptible to an IP spoofing attack may be detected and modification of the TCP sequence number generator in the protocol stack may be adjusted to make an IP spoofing attack less likely to succeed.

Another embodiment of the present invention for detecting security vulnerabilities in the configuration rules of a router includes a communication message generator for generating and sending communication messages to computers coupled through an open network to a router and a response message detector for detecting responses from computers on the network generated in response to the communication messages. This embodiment of the present invention detects the vulnerability of the router to pass communication messages to computers on the network. Depending on the type of communication or service command message to which a computer responds, the inventive system may determine rules not implemented by a router. In one preferred embodiment, the communication message generator includes a Socks configuration verifier which establishes a communication connection with a Socks server and attempts to send service command messages for different services with source addresses for computers on the network. The responses of the destination computer are examined to determine the types of messages which the Socks server passes to computers on the network from computers external to the network. This system may be used to verify the rules actually implemented by a Socks server.

In another embodiment, the communication message generator includes a source porting verifier which sets the source port address in a header for a generated communication message to a predetermined value to see if the router passes externally generated messages having the specified source port address to the network. Preferably, the predetermined value is the default source port identifier for a service having a known required predetermined source port address such as an FTP service. In this manner, the system of the present invention detects whether a computer external of the network can establish a communication connection with a computer on the network by using a predetermined source port identifier to avoid other rules in a router.

In another embodiment of the present invention, the communication message generator includes a source routing verifier which generates source-routed communication messages to determine whether the router has a source router message blocking rule activated. This embodiment may be used to determine whether the rules that the router applies to communication messages originated by computers external to the network may be bypassed by using source routed messages.

In another embodiment of the present invention, an RPC message generator generates RPC service command messages which are sent to ports of computers on a network to detect the ports coupled to RPC services having little or no authorization checks. These ports and the coupled services, if determined, may be stored and provided to a network administrator for installing more rigorous authorization checks.

In another embodiment of the present system, a communication initiation message generator for generating communication initiation messages for a three handshake protocol and a response message evaluator are used to determine which of the ports on each computer in a network have a service coupled thereto. This inventive system operates by sending sync messages to each port on every computer on the network and building a table of service identifiers which identify those ports which responded with a message indicating the presence of a service. Preferably, the communication initiation message is a sync message for TCP/IP networks and the messages indicating a service is coupled to a port is a sync/ack message. In this manner, the inventive system may build a map of those ports of each computer on the network which have service coupled thereto without creating a log of any communication connections on any the computers on the network. Since communication connections are only established and logged when the originating computer sends the ack message, this embodiment generates a map of available services in a stealth manner. This embodiment of the inventive system may be coupled with one or more of the other embodiments which generate service command messages to eliminate ports from the attempts to detect vulnerable services. Such a system speeds the security analysis of a network.

These and other advantages and benefits of the present invention may be ascertained from reading of the detailed specification in conjunction with the drawings.

DESCRIPTION OF THE DRAWINGS

The accompanying drawings, which are incorporated and constitute a part of this specification, illustrate a number of embodiments of the invention and, together with the general description given above, and the detailed description of the embodiments given below, serve to explain the principles of the invention.

DETAILED SPECIFICATION OF EMBODIMENTS OF THE INVENTION

Figure 1:
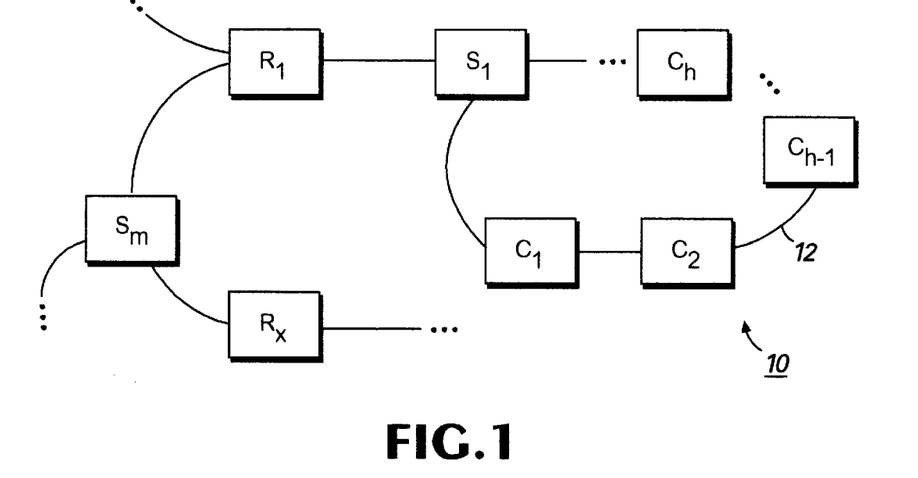
FIG. 1 is a schematic of an open network system.

An open network system in which a system made in accordance with the principles of the present invention may be used is shown in FIG. 1. An internetwork 10 may be comprised of a network 12 which in turn may be coupled to other servers, gateways and routers. Network 12 includes a plurality of computers $C_1$–$C_n$ which are coupled through network 12 to a server $S_1$. This network in turn may be coupled to a router $R_1$ to provide further secured computer communication with other servers represented by $S_m$ or other routers labeled $R_x$ as shown in FIG. 1. Although the principles of the present invention are extensible to other protocols, the invention is preferably used on networks which utilize the TCP/IP protocol. The computer program implementing a system or method of the present invention may reside on any of the computers on the network 12 or any server or any router of internetwork 10.

Figure 2:
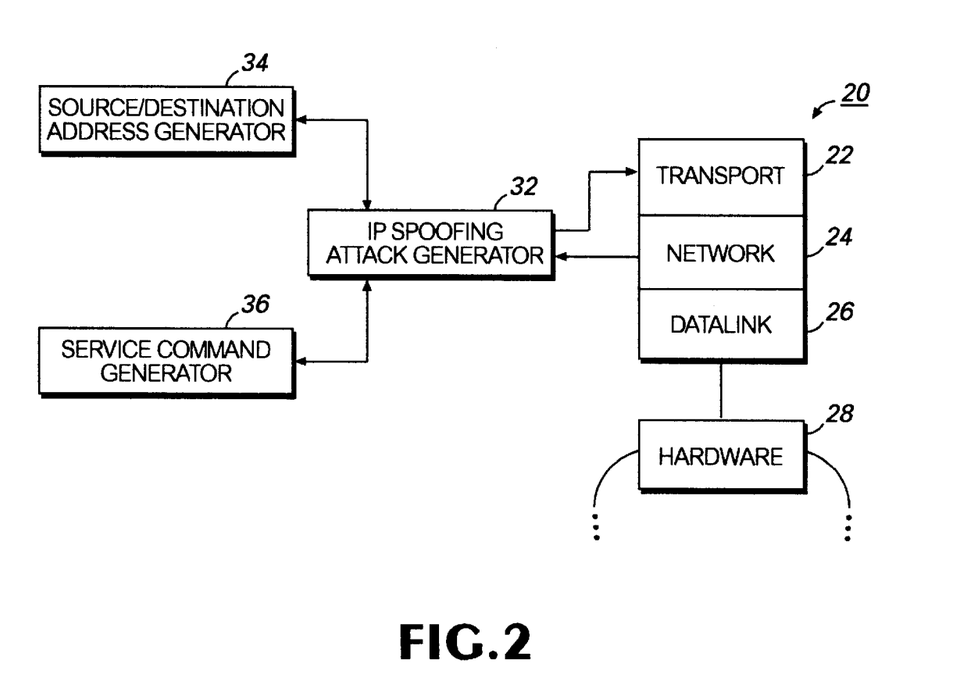
FIG. 2 is a block diagram of an embodiment of the present invention used to detect IP spoofing attack vulnerability.

Structure of a system embodiment made in accordance with the principles of the present invention is shown in FIG. 2. A computer executing a program implementing the system or method of the present invention would typically include the programs and communication hardware card which implement a protocol stack 20. Protocol stack 20 is comprised of transport layer 22, network layer 24 and datalink layer 26. These layers of protocol stack 20 operate in the well-known manner set forth above. The data frame prepared by datalink layer 26 is passed to communication hardware 28 for transmission to other computers in accordance with the source and destination information provided in the various headers generated by protocol stack 20.

In one embodiment of the present invention which detects a computer's vulnerability to IP spoofing, the system includes an IP spoofing attack generator 32, a source/destination address generator 34 and a service command generator 36. Source/destination address generator 34 identifies the internet and physical addresses of the computers on the network 12 to be tested. Source/destination address generator 34 verifies that each computer on network 12 is emulated in IP spoofing attacks on all of the other computers on network 12. In this manner, the inventive system exhaustibly tests all possible attack combinations on a network. Service command generator 36 generates commands for a service which may be coupled to a port which IP spoofing attack generator 32 is able to initiate a communications connection. Preferably, service command generator 36 generates commands for services which have little or no authorization checks. "Little" means that the authorization check verifies a computer address is on the network 12 or the like while "no" authorization check means the service executes any valid server command received on a port regardless of originating source. Preferably, service commands are generated for electronic mail, file transport protocol (FTP) and Telnet services. These commands preferably indicate that a target computer identified by a destination address has been compromised without altering the target computer's operational parameters such as changing system privileges for a user or deleting data files. Examples of such commands include a Telnet session initiation command such as telnet attack_computer_address where attack_computer_ address is the address of the computer which performed the IP spoofing attack on the target computer. Another example of such a message is mail admin message where admin indicates the system or network administrator's mailbox and message indicates the contents of the message informing the administrator of the compromise. The service command received from command message generator 36 and the source and destination addresses received from source/destination address generator 34 are used by IP spoofing attack generator 32 to provide data and header content for messages sent to transport layer 22 and network layer 24 of protocol stack 20 which are used to implement the IP spoofing attack and detection.

Figure 3:
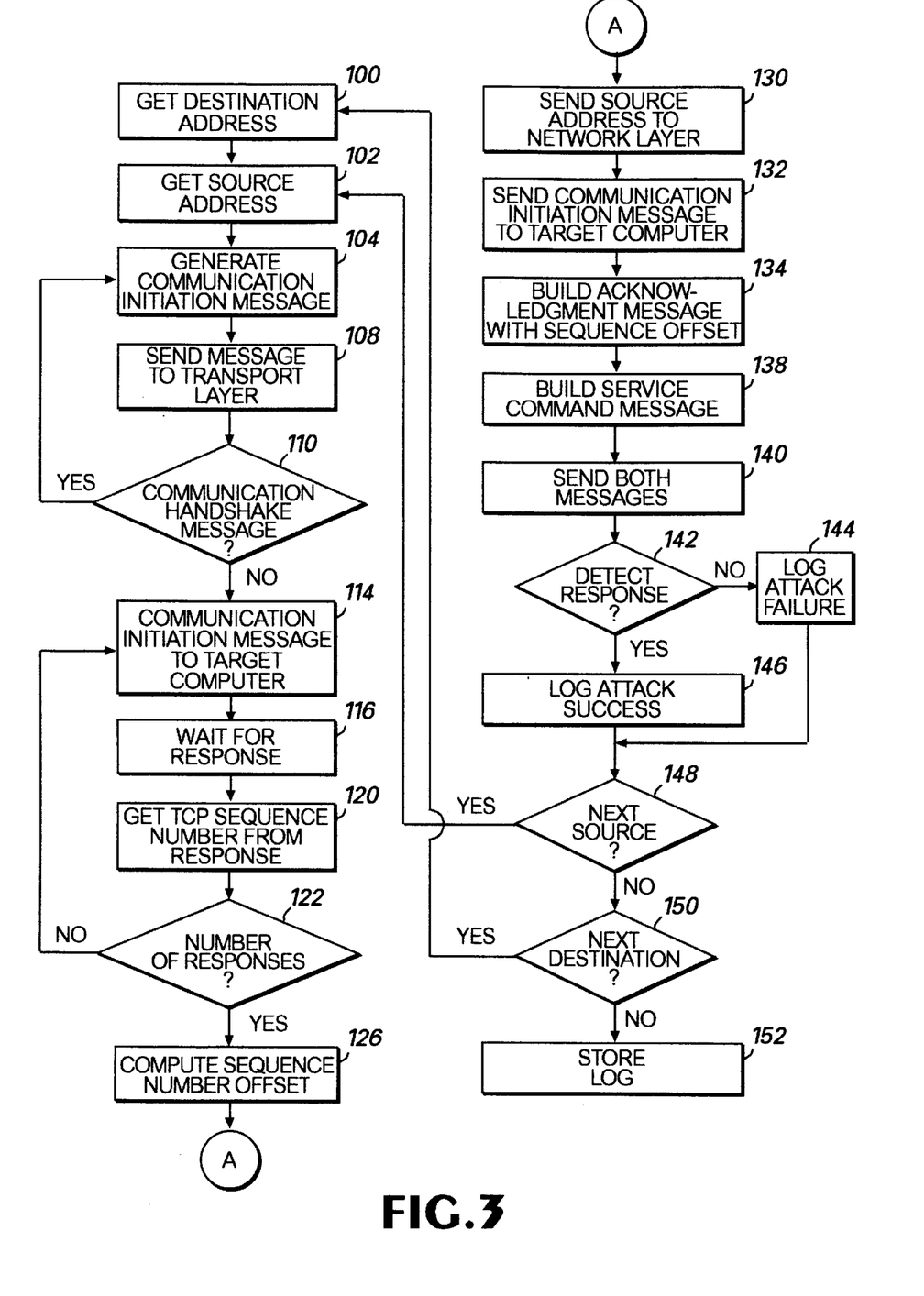
FIG. 3 is a flow chart of the preferred process implemented by the embodiment depicted in FIG. 2.

The process implemented by IP spoofing attack generator 36 is shown in FIG. 3. That process begins by obtaining a destination address (Block 100) and a source address (Block 102) from source/destination address generator 34. Attack generator 32 then generates a communication initiation message for a three handshake protocol which is preferably a synchronization or sync message for the TCP/IP protocol (Block 104). The communication initiation message is sent to a port on the source address computer by placing the message in a TCP segment and passing it to the transport layer (Block 108). Transport layer 22, network layer 24 and datalink layer 26 all appropriately encapsulate the sync message for transmission to the computer at the source address which is the address of the computer to be emulated in the IP spoofing attack. The process awaits the reception of a handshake acknowledgment message from the computer at the source address (Block 110). The handshake acknowledgment message in the TCP/IP protocol is a sync/ack message. If a sync/ack message is received, another sync message is generated and sent to the same port address of the computer at the source address. This process continues until no sync/ack message is received from the computer at the source address within a predetermined time. These steps are performed to fill the communication buffer for a port on the source address computer with half-opened communication connections. This full buffer condition exists until the time period for completing a communication connection expires. In most computers, the expiration period is at least 10 minutes which is typically enough time to complete the attack. Because its buffer is full, this port on the computer at the source address no longer responds to communication initiation messages.

A sync message is then generated and transmitted to the computer at the destination address which now defines the target computer (Block 114). The process waits for a sync/ack message from the computer at the destination address (Block 116). When it is received, the process retrieves the TCP sequence number from the TCP segment header (Block 120) and checks to see if a predetermined number of TCP sequence numbers have been retrieved from the target computer at the destination address (Block 122). If the predetermined number of sequence numbers has not been received, a time period corresponding to the unit of time between changes in TCP sequence number modifications is delayed. This delay permits the computer at the destination address to modify the TCP sequence number which is used for initiating a communication session. Alternatively, the destination port address on the target computer may be changed to cause a sequence number increment as well. After this delay has expired or the destination port address changed, another sync message is generated and sent to the target computer (Block 114). When the predetermined number of TCP sequence numbers have been received, the TCP numbers are used to evaluate the offset between TCP sequence numbers or the pattern for generating the TCP numbers (Block 126). For example, if a predetermined offset amount is added to generate a new TCP sequence number for communication initiation, three TCP sequence numbers may be used to compute the difference between two adjacent TCP numbers. This difference should indicate the predetermined offset so that the next TCP sequence number which would be used by the target computer to respond to a new sync message is determined.

The IP spoofing attack process continues by setting the source address in the network layer 24 to the source address retrieved from source/destination address generator 34 (Block 130). Now messages generated by the computer implementing the system and method of the present invention generates messages which appear to be originated from the computer at the source address. A communication initiation message is then generated and transmitted to the computer at the destination address (Block 132). A period of time is delayed which corresponds to the normal response time for the target computer to send a sync/ack message. The process then prepares an ack message with the predicted TCP sequence number (Block 134). A service command is obtained from a service command generator 36 and placed in a TCP segment passed to transport layer 22 to build a service command message (Block 138). Both messages are then transmitted to the target computer to emulate an ack message and service command message from the emulated computer with the blocked port. If the predicted TCP sequence number for the ack message having the source address of the emulated computer matches the TCP sequence number sent by the target computer in the sync/ack message, the target computer establishes a communication connection which accepts messages having a source address of the emulated computer. Now the service command message sent from the computer implementing the process of FIG. 3 is accepted and executed by the service coupled to the port if the command is valid for the service. Preferably, the service command causes the computer at the destination address to log the attack at the computer which has been compromised and, most preferably, the command causes the target computer to send a compromise indicator to the computer implementing the process of FIG. 3, although another computer may receive the compromise indicator. The success or failure of the attack is logged (Block 142–146). Preferably, a Telnet session is established between the compromised target computer and the computer executing the program which implements the process of FIG. 3. Initiation of the Telnet session may be logged to record the success of the IP spoofing attack and additional information may be obtained during the Telnet session about the compromised computer to search for other security vulnerabilities of the target system.

The process then determines whether another source address exists on the network (Block 148), and if there is, an attack on the target computer is attempted using the computer at the new source address as the emulated computer. If all of the source addresses have been used, the process checks to see if another destination address is available (Block 150). If another source address is available, the process is repeated to evaluate attacks from each of the other computers on the network on the target computer defined by the new destination address. This process continues until each computer on the network has been used to attack all the other computers on the network. Once this has been done, the attack log may be stored in table 46. The log may be later displayed to identify those computers on the network that are susceptible to IP spoofing attacks or provide other information obtained from the target computers that were compromised (Block 152).

Figures 4, 5:
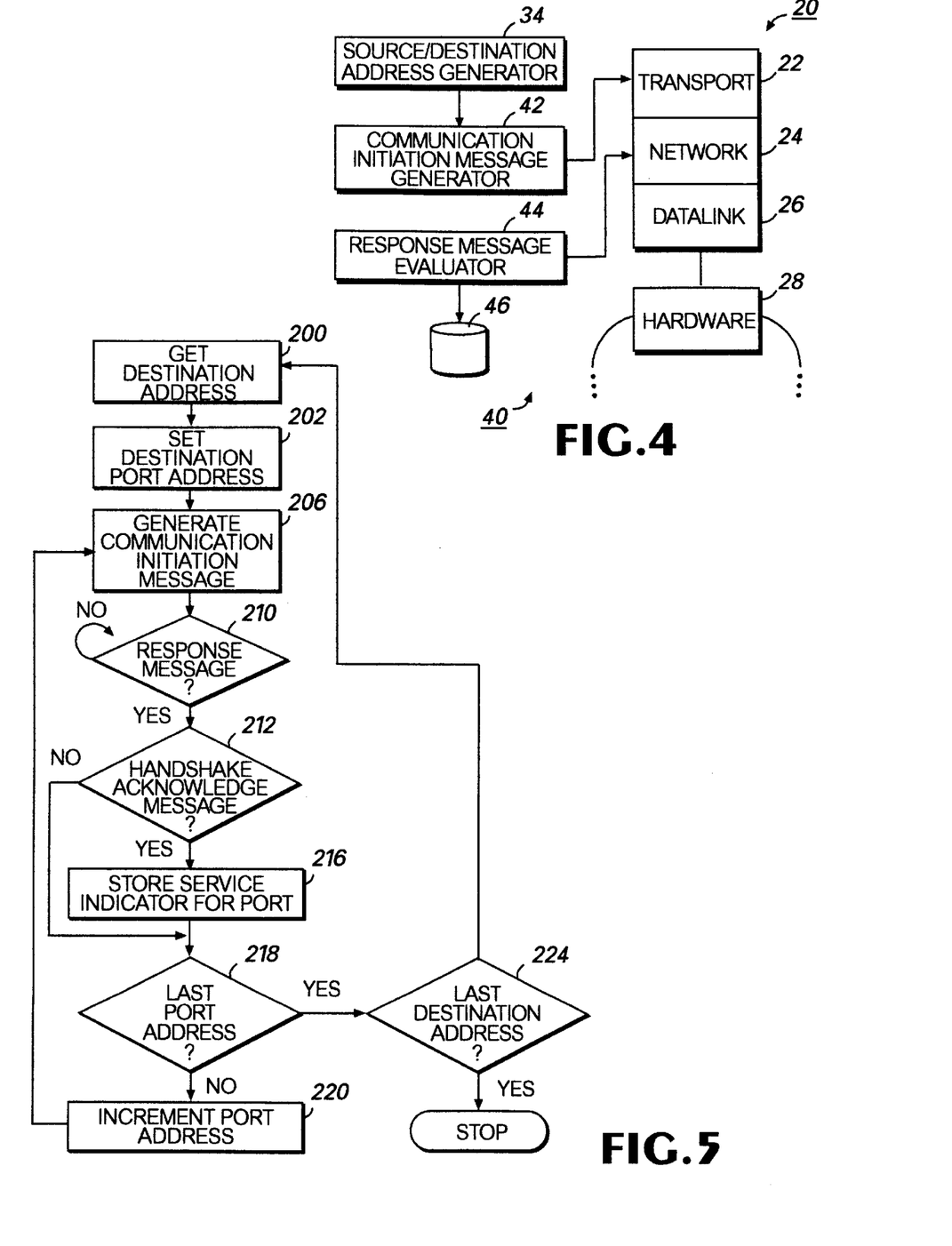
FIG. 4 is a block diagram of an embodiment of the present invention used to map the ports of computers of a network which are coupled to services without generating communication connections.
FIG. 5 is a flow chart of the preferred process implemented by the embodiment depicted in FIG. 4.

Another embodiment of the present invention is shown in FIG. 4. System 40 includes a communication initiation message generator 42 and a response message evaluator 44 for determining whether a service is coupled to a port responding to a communication initiation message. System 40 builds a topology table 46 of service ports for network 12 from the communication initiation responses without causing a communication connection which may be logged by the computer having the ports which are being interrogated. Communication initiation message generator 42 is coupled to transport layer 22 of protocol stack 20 so communication initiation messages may be provided to transport layer 22 for transmission to the ports of the other computers coupled to network 12. Preferably, the communication initiation messages are sync messages used in the three handshake protocol of a TCP/IP network. Response evaluator 44 is also coupled to transport layer 22 to receive the response messages to the communication initiation messages sent by a computer executing a program implementing the process shown in FIG. 5. If the response message is the handshake acknowledgment message in the communication connection process, response evaluator 44 records the port address as a service access port for network 12 in table 46. In the three handshake protocol used to establish a communication connection on a TCP/IP network, a sync/ack message is the handshake acknowledgment message which indicates a service is present on a port.

The process implemented by system 40 of FIG. 4 is shown in FIG. 5. The process begins with communication initiation message generator 42 obtaining a destination address of a computer on network 12 from source/destination address generator 34 (Block 200) and the destination port address is set to the first port address on the destination computer (Block 202). Most computers in a TCP/IP protocol have port addresses in the range of 0–65,535. Preferably, each port address is tested by system 40. A communication initiation message is generated for the first port address of the computer at the destination address and passed to transport layer 22 (Block 206). After the communication initiation message is transmitted, response evaluator 44 waits for receipt of a response message from the port to which the communication initiation message was sent (Block 210). Response evaluator 44 then determines whether the message is a handshake acknowledgment message (Block 212). If it is, response evaluator 44 stores a service indicator, the destination address and port address in service topology table (Block 216). In a TCP/IP network, a sync/ack message indicates a service is coupled to the port while a reset message indicates no service is coupled to the port. The process then checks to see if the port address is the last possible port address on the computer (Block 218). If it is not, the port address is incremented (Block 220) and a new communication initiation message is sent to the next port address of the computer at the destination address (Block 206). The process continues until all of the port addresses on a computer have been tested to determine whether a service is coupled to each port. After each port has been checked for a service, the process determines whether another destination address is available (Block 224). If there is, another destination address is obtained (Block 200) and the process continues at the first port address for the next computer. The process terminates when all of the computers on network 12 have been checked.

Figures 6, 7:
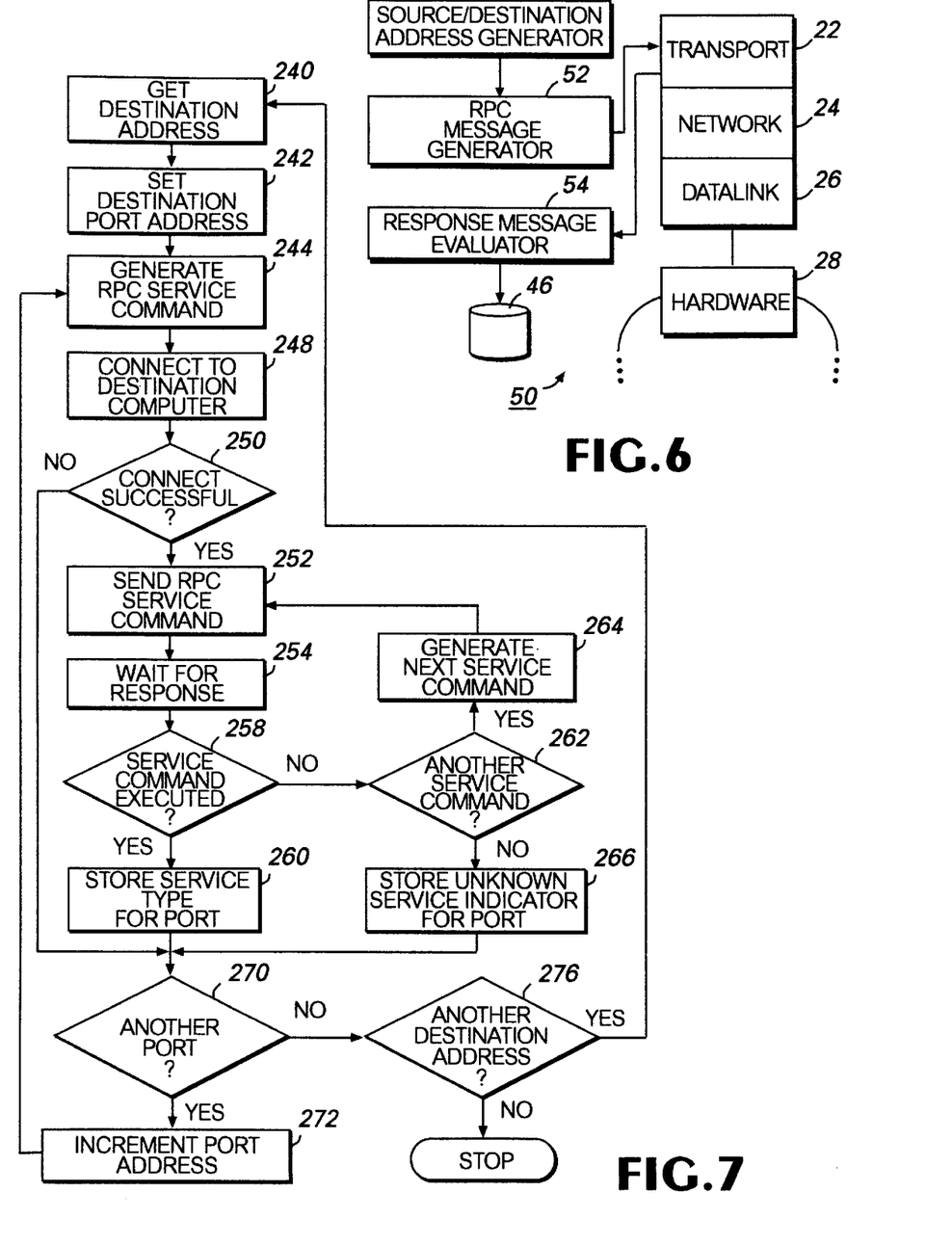
FIG. 6 is a block diagram of an embodiment of the present invention used to detect Remote Procedure Call (RPC) services available on a network which have little or no authorization checks.
FIG. 7 is a flow chart of the preferred process implemented by the embodiment shown in FIG. 6.

Another embodiment of the present invention is shown in FIG. 6. In system 50, a RPC message generator 52 and response evaluator 54 are coupled to transport layer 22. RPC message generator 52 generates a data segment having a command for an RPC service which may not require an authorization check such as a password. Response message evaluator 54 determines from a message received in response to the RPC service command message whether an RPC service having little or no authorization check is available over the network. A record of this service may be provided to the system or network administrator.

The process implemented by system 50 is depicted in FIG. 7. The process begins by obtaining a destination address for a computer on the network 12 from source/destination address generator 34 (Block 240). The destination port address is initialized to the first port address on the computer at the destination address (Block 242) and a first RPC service command is generated by RPC message generator 52 (Block 244). Preferably, a CONNECT command which identifies the destination address and port address is issued to transport layer 22 (Block 248). Once a communication connection has been established, transport layer 22 notifies RPC message generator 52 (Block 250). RPC message generator 52 then passes the generated service command to transport layer 22 and a message containing the service command is transmitted to the port with which communication has been established (Block 252). Response message evaluator 54 then waits for a response (Block 254). If a response is detected which indicates the service command was executed (Block 258), the destination address, port address and type of RPC service is stored in topology table 46 (Block 260). If no communication connection was established with the port, no entry is made for the port. If communication is established but the port does not respond to the first service command, RPC message generator 52 determines if another RPC service command is available (Block 262) and, if there is, it generates a service command for another service (Block 264) and passes the command to transport layer 22 (Block 252). There are a number of known RPC commands for the UNIX operating system and RPC message generator 52 may generate a service command for each one to determine if it exists on a port being tested. If the process does not determine that an RPC service is coupled to the port, it identifies the service as a non-RPC service and stores an unknown or non-RPC service indicator in table 46 (Block 266). Response evaluator 54 evaluates any message received which was responsive to the next service command (Blocks 254, 258). After the process finishes its interrogation of a port for the type of service coupled to the port, the process determines whether another port exists (Block 270). If there are other ports to be interrogated, the port address is incremented (Block 272) and the process continues until all the ports on the computer at the destination address have been tested. The process then continues by determining whether another destination address for a computer on the network exists (Block 276) and, if it does, repeating the process for each port on that computer. When the process of FIG. 7 is completed, a topology map has been built which identifies the port and the RPC service coupled to each port for each computer on the network.

System 50 of FIG. 6 may be combined with system 40 of FIG. 4 such that once topology table 46 identifying those ports which are coupled to a service has been generated by response evaluator 44 of system 40, RPC message generator 52 need only attempt to identify which of the ports identified as being coupled to a service are coupled to an RPC service having little or no authorization check. Response evaluator 54 of system 50 message generator may then identify the RPC services for those ports which respond to service commands generated by RPC message generator 52.

Figure 8:
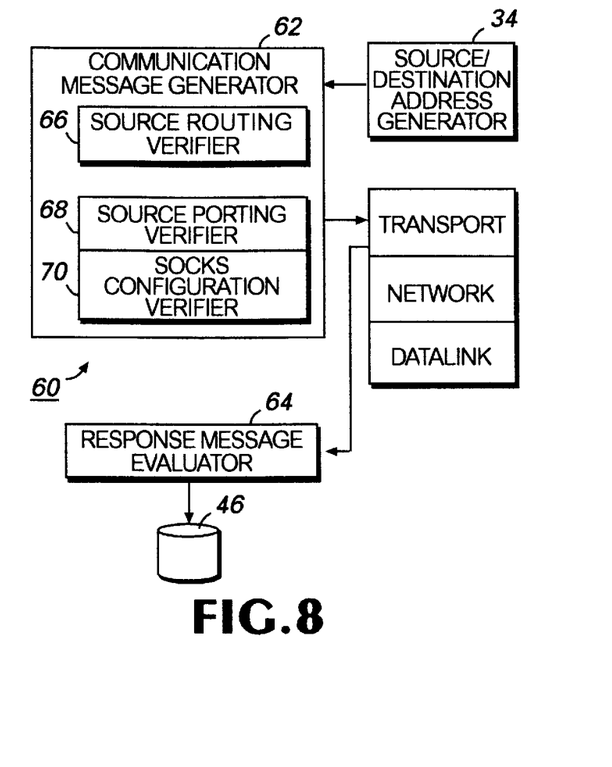
FIG. 8 is a block diagram of an embodiment of the present invention used to verify the configuration of routers and/or Socks servers.

An embodiment used to test the configuration of a router is shown in FIG. 8. System 60 includes a communication message generator 62 and a response evaluator 64. Preferably, communication message generator 62 includes a source routing verifier 66, a source porting verifier 68 and a Socks configuration verifier 70. Socks configuration verifier 70 and source routing verifier 66 execute in the application layer of a computer which is located outside network 12 and router RI which controls access to network 12. Source porting verifier 68 specifies a source port for data messages being sent to a computer on network 12 and, consequently, it communicates with transport layer 22 and network layer 24 of protocol stack 20 on the computer executing the program which implements system 60.

Figure 9:
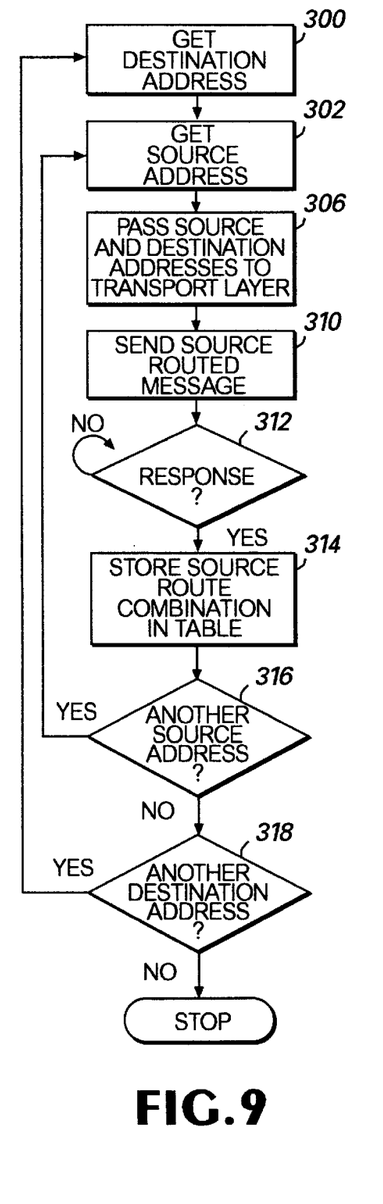
FIG. 9 is a flow chart of the preferred process implemented by the source routing verifier of FIG. 8.

The process performed by the source routing verifier 66 is shown in FIG. 9. That process begins by obtaining a destination address for a computer on network 12 from source/destination address generator 34 (Block 300). The computer to which the message is to be ultimately delivered is defined by a destination address. The source address used to identify an intermediate source for a source routed message is also obtained from source/destination address generator 34 (Block 302). Source routing verifier 66 then passes the source and destination addresses to transport layer 22 (Block 306) to source route a message to a computer at the destination address on network 12 through the intermediate source identified by the source address (Block 310). If a response is detected by response message evaluator 64 to the source routed message (Block 312), a log indicating that the source routing blocking feature is not activated for the particular source/destination address combination is recorded in table 46 (Block 314). If another source address is available for another computer on the network (Block 316), it is obtained and another source routed message through the selected source address to the destination address is attempted. After attempts to source route messages to the destination address through all the source addresses for the other computers on the network have been attempted, the process determines if all destination addresses have been tested (Block 318). If another destination address is available, another destination address is obtained and the process is repeated using the addresses of the other computers on the network as source addresses for source routed messages to the next destination address. In this manner, a log of all the source routed combinations which are not being blocked by the router are recorded in table 46 so the router may be reconfigured.

Figure 10:
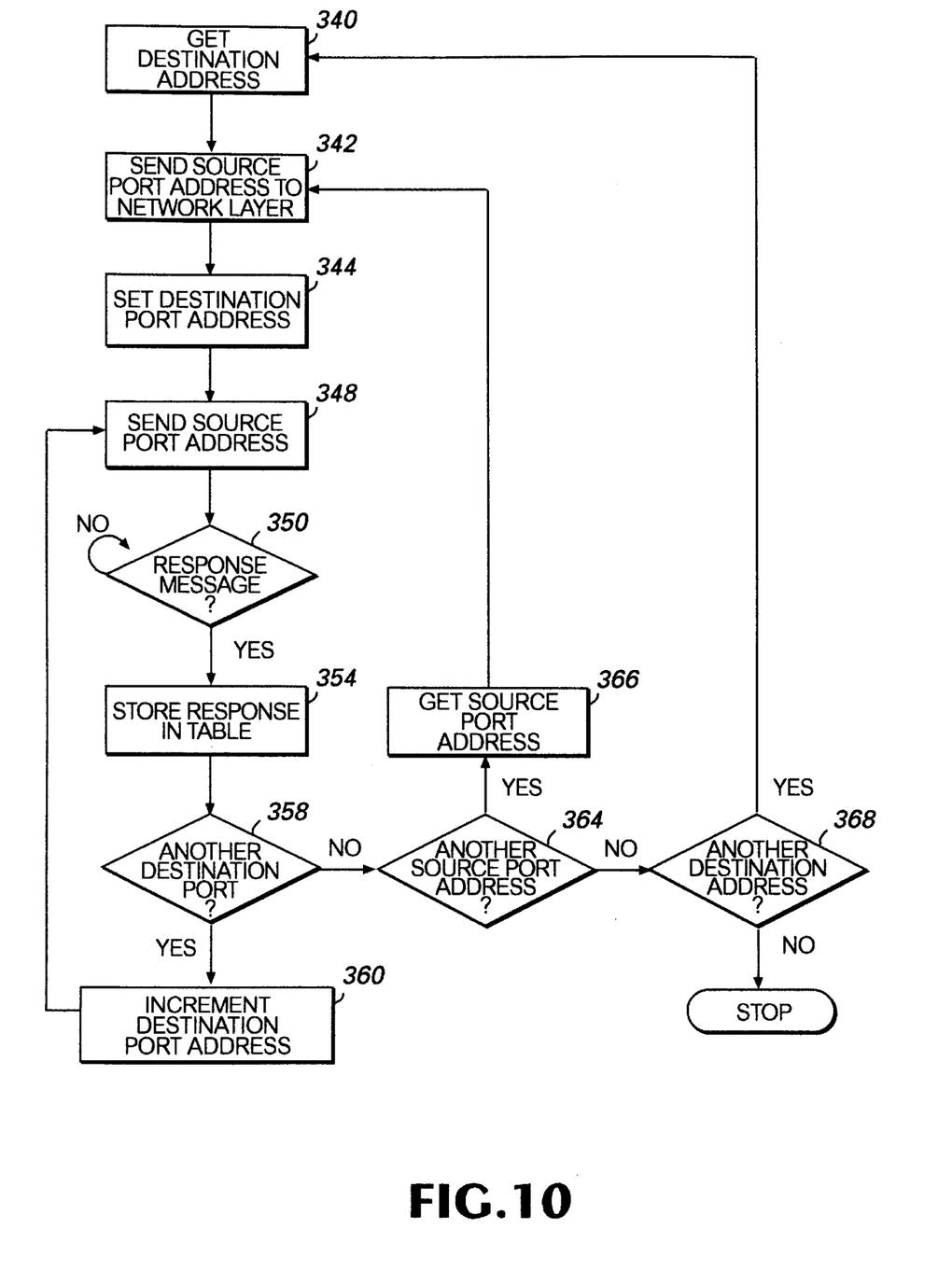
FIG. 10 is a flow chart of the preferred process implemented by the source porting verifier of FIG. 8.

FIG. 10 shows a process implemented by source porting verifier 68. The process begins by obtaining a destination address for a computer on the network from source/destination address generator 76 (Block 340). Preferably, a source port address which corresponds to the default FTP source port address, typically port address 20, is provided to network layer 24 (Block 342). Until it is changed, data messages from the computer executing the program which implements the process of FIG. 11 generates data messages having a source port address of 20. The destination port address is set to the first port address (Block 344) and a data message having a source port address of 20 is sent to the port of the computer at the destination address (BLOCK 348). Response evaluator 72 evaluates the responsive message received (Block 350), if any, to determine whether the port responded to the source ported data message. Each response is stored in table 46 (Block 354). The process determines if there is another destination port address (Block 358) and, if there is, the destination port address is incremented (Block 360). The process continues by checking the next destination port. If all the destination ports on the destination computer have been checked, the process determines if another source port address is to be tested (Block 364). If there is, the next source port address is obtained (Block 366) and the ports of the destination computer are tested with messages having the new source port address. Alternatively, all source port addresses may be exhaustively tested. If there are no more source port addresses to check, the process determines if another destination address exists on the network (Block 368). If it does, the next destination address is obtained (Block 340) and the process continues. Otherwise, the process stops.

A router may be configured with a rule which blocks data messages from computers external to network 12. However, another rule may permit messages with certain source port address values to pass through in order to support certain services such as FTP. FTP requires a source port address of 20. A hacker may attempt to get into a network by sending messages with a source port value which a router passes because it conforms to the rule for FTP messages. The process of FIG. 10 determines whether messages with predetermined source port addresses from computers external to the network are able to be received by computers on a network despite router configuration rules which would otherwise prevent the transmission of the messages.

As discussed above, Socks servers do not pass simply pass messages between computers on the network and those external to the network but instead require two separate communication connections. One communication connection is with an external computer and the other communication connection is with a computer on the network. In this manner, the Socks server may more thoroughly examine message in accordance with the rules configured for the server before passing the messages from one communication connection to another communication connection.

Figure 11:
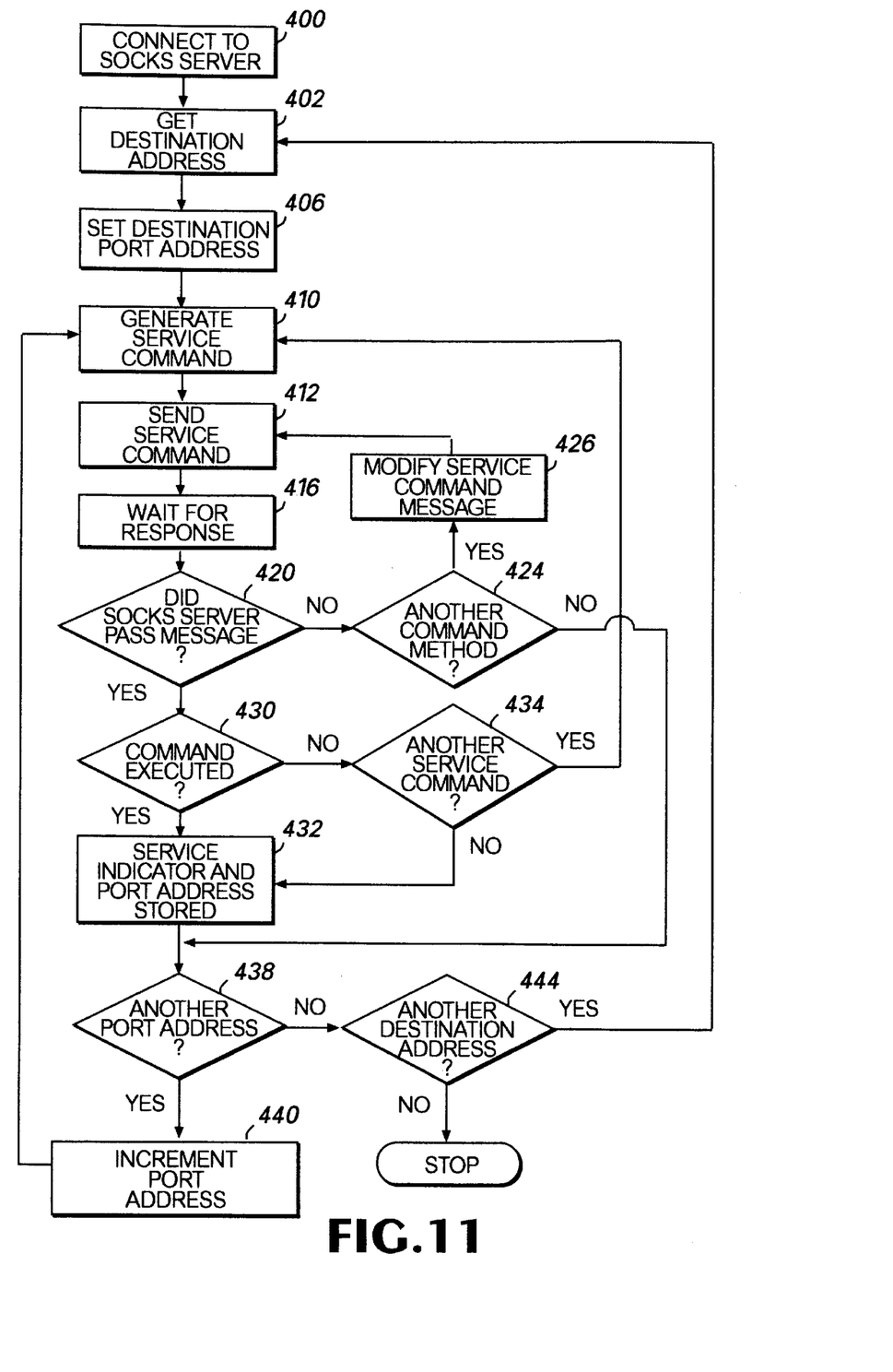
FIG. 11 is a flow chart of the preferred process implemented by the Socks server verifier of FIG. 8.

A preferred process implemented by the Socks configuration verifier of FIG. 8 is shown in FIG. 11. That process begins by having the computer executing the program which implements the process of FIG. 11 connect to the Socks server (Block 400). A destination address is then obtained from the source/destination address generator 34 and used to request that the Socks server connect to the computer on the network at the destination address (Block 402). The destination port address is set to the first port address value of the possible range of port address values (Block 406). A service command is then generated (Block 410) and a service command message addressed for the computer at the destination address is sent to the Socks server (Block 412). The process then waits for a response (Block 416). The response message is evaluated by response message generator 64 to determine if the response message indicates that the computer at the destination address received the service command (Block 420). If it did not, the process determines if another communication method is available (Block 424). If there is, the service command message is modified for another communication method (Block 426) and sent to the Socks server (Block 412). For example, if the message did not go through the Socks server, the service command message may be reformatted as a source routed message or a message with a predetermined source port value to see if the Socks server passes that type of message to the computer at the destination address. If no other communication format is available, the process continues by determining if another port address is available (Block 438).

If the message indicates that the computer on the network responded to the service command, the process determines whether the service command was executed (Block 430). If it was, the service and port address are stored in table 46 (Block 432). If the response message indicates that the service command was received but not executed, the process determines if another service command is available (Block 434). If there is, a new service command is generated (Block 410) and the process continues until all service commands have been attempted for the port address at the destination address computer. If no other service commands remain to be tried, an indicator is stored in table 46 which indicates communication was established with the port address but no service was executed (Block 432).

The process continues by determining if another port address remains for the computer at the destination address (Block 438). If one does, the port address is incremented (Block 440) and the testing for the new port address continues (Block 410). Otherwise, the process determines whether another destination address is available on the network (Block 444). If there is, it is obtained from source/destination address generator 34 (Block 402) and testing of the computer at the new destination address continues. Otherwise, the communication connection with the Socks server is terminated and the process stops.

Figure 12:
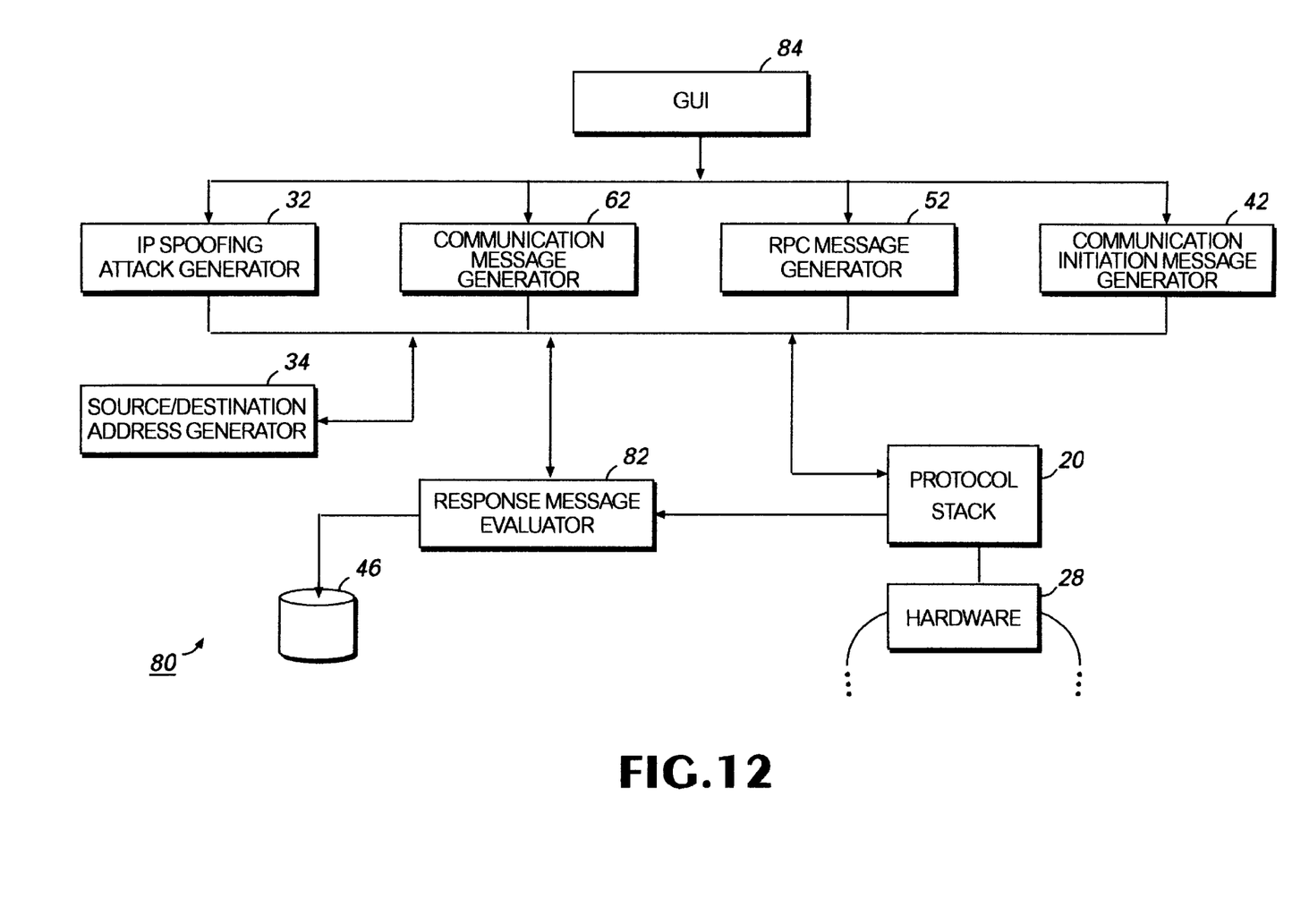
FIG. 12 is a block diagram of a preferred embodiment of the present invention which incorporates the components of the systems shown in FIGS. 2, 4, 6 and 8.

A more preferred embodiment of the present invention is shown in FIG. 12. System 80 includes IP spoofing attack generator 32, communication initiation message generator 42, RPC message generator 52, communication message generator 62, source/destination address generator 34, topology table or log 46 and protocol stack 20 which operate in manner consistent with the description of the embodiments for those like numbered components discussed above. System 80 also includes response evaluator 82 which includes the functionality of response message evaluators 44, 54 and 64 as discussed above. A Graphic User Interface (GUI) 84 is also provided to accept input and control from a user and to display options and information to a user in a known manner. A user may use GUI 84 to activate each of the network verifiers 32, 42, 52 or 62 individually or selectively identify a group of verifiers to automatically execute and build the information in table 46. GUI 84 also permits a user to enter information for execution of the verifiers such as defining or adding predetermined source port addresses, RPC services, addresses for computers added or deleted from a network or the like.

In operation, a user activates the program which implements an embodiment of the present invention such as system 80. As a result, GUI 84 may present options to the user such as modifying information for system operation, selection of one or more of the network verifiers or display of stored information. After the user makes a selection, system 80 then performs the requested option. For example, if the user selects the system information modification option, the user is permitted to change system information such as adding addresses for new computers on a network. GUI 84 then returns the user to the main option menu following completion of the input of data and the user may now select one or more network verifiers to run. GUI 84 then selectively activates the selected network verifiers which communicate with protocol stack 20 to communicate messages between the computer executing system 80 and a computer on the network being tested or a router or a Socks server coupled to the network. When the verification tests or scans are completed, the user may select the display option and either view or print the information The user may then use the displayed information to add authorization checks to services or new rules to a Socks server or router.

While the present invention has been illustrated by the description of a number of embodiments and while the embodiments have been described in considerable detail, it is not the intention of the applicant to restrict or any way limit the scope of the appended claims to such detail. Additional advantages and modifications will readily appear to those skilled in the art. The invention in its broader aspects is therefore not limited to the specific details, representative systems and methods, and illustrative examples shown and described. Accordingly, departures may be made from such details without departing from the spirit or scope of applicant's general inventive concept.

What is claimed is:

1. A system for detecting a security vulnerability in open network communications comprising:

an internet protocol (IP) spoofing attack generator for generating an IP spoofing attack on a target computer coupled to an open network to determine whether said target computer is vulnerable to an IP spoofing attack which emulates communication from another computer on said open network;

a service command message generator for generating a service command to be executed by a service coupled to a port on said target computer; and said IP spoofing attack generator transmitting said service command to said target computer to generate a response in said target computer that provides a compromise indication without altering system operational parameters of said target computer.

2. The system of claim 1, wherein said generated service command is for one of an rsh and an rlogin service to determine whether authorization checks for said service exist.

3. The system of claim 2, wherein said generated service command causes said target computer to generate an electronic mail message indicative that said target computer has been compromised.

4. The system of claim 3, wherein said generated service command causes said target computer to initiate a Telnet session with a computer which logs said Telnet session to indicate said target computer has been compromised.

5. The system of claim 1, further comprising:
a source/destination address generator which generates source and destination addresses for messages corresponding to an open network protocol used to communicate on said open network, said destination address corresponding to said target computer and said source address corresponding to said computer being emulated for said attack.

6. The system of claim 5, wherein said source/destination address generator generates source and destination address combinations which are used by said IP spoofing attack generator to test vulnerability of each computer in said open network to an IP spoofing attack which emulates communication from each of said other computers on said open network.

7. A system for generating a service topology map for each computer on an open network without completing a communication connection with any computer on the open network comprising:
a communication initiation message generator for generating communication initiation messages, said communication initiation messages being transmitted to ports on a computer on an open network; and
a response message evaluator for determining from response messages received from said ports receiving said communication initiation messages whether services exist on said ports receiving said communication initiation messages, said response messages not completing communication connections with said ports so that services coupled to said ports may be detected without completing communication connection with said ports.

8. The system of claim 7, further comprising:
a table for storing service indicators indicative of which ports responding to said communication initiation messages are coupled to services.

9. The system of claim 8, wherein said communication initiation message generator generates a communication initiation message for each port address on a computer on said open network.

10. The system of claim 9, wherein a source/destination address generator generates a destination address for each computer on an open network so that each port on each computer on said open network receives a communication initiation message and said table contains service indicators for each port of each computer on said open network which responds to said communication initiation messages.

11. The system of claim 7, wherein said communication initiation message generator generates sync messages for a TCP/IP protocol.

12. The system of claim 11, wherein said response message evaluator determines a service is coupled to a port receiving a communication initiation message in response to detecting a sync/ack message.

13. The system of claim 7, wherein said communication initiation message is the first message for a three handshake protocol to establish a communication connection.

14. A system for detecting vulnerability of ports coupled to remote procedure call (RPC) services on a computer of an open network comprising:
a remote procedure call (RPC) message generator for generating and sending RPC service commands to ports on a computer on an open network; and
a response message evaluator for evaluating response messages from said ports of said computer receiving said RPC service commands, said response messages indicating whether said RPC service commands were executed by an RPC service coupled to said ports of said computer receiving said RPC service commands without establishing a communication connection with said ports.

15. The system of claim 14, further comprising:
a table for storing port addresses and service indicators that indicate which particular RPC services are coupled to ports receiving said service commands.

16. A system for detecting vulnerabilities in routers comprising:
a communication message generator for generating and sending service commands from a computer external to an open network to ports on computers coupled to said open network through a router; and
a response message evaluator for evaluating response messages received from said ports on computers of said open network in response to said service commands sent from said communication message generator external to said open network whereby access to said computers on said open network through said router may be determined without referencing configuration files of said router.

17. The system of claim 16, wherein said communication message generator includes a source routing verifier for generating source routed messages with a destination address of a computer on said open network and an intermediate source address on said open network; and
said response message evaluator evaluating response messages received from said ports on computers of said open network in response to said service commands sent from said communication message generator external to said open network to detect a vulnerability in said router of permitting source routed messages to bypass rules configured for filtering inbound messages on said router.

18. The system of claim 17, wherein each source address for each computer on said open network is used as said intermediate source address with each destination address for each computer on said open network to test each possible intermediate source/destination address combination for source routed messages on said open network.

19. The system of claim 18, further comprising:
a table for storing indicators for each intermediate source address/destination address combination that is detected as being vulnerable to receiving source routed messages.

20. The system of claim 16, wherein said communication message generator includes a source porting verifier for generating service command messages with a source port address having a predetermined value; and
said response message evaluator evaluating response messages received from said ports on computers of said open network in response to said service command messages having said predetermined source port address values sent from said source porting verifier external to said open network to detect said router passing messages having said predetermined source port address values to ports coupled to services on said open network.

21. The system of claim 20, wherein service command messages having said predetermined source port address value are sent to each computer on said open network.

22. The system of claim 21, further comprising:
a table for storing service indicators for each computer address that is detected as being vulnerable to receiving source ported messages.

23. The system of claim 22, wherein said predetermined value corresponds to a default source port address for a file transfer protocol (FTP) message of a TCP/IP protocol.

24. The system of claim 16, further comprising:
   a Socks configuration verifier for establishing a communication connection with a Socks server and for sending service command messages to computers on said open network coupled to said Socks server; and
   said response message evaluator evaluating said messages received in response to said service command messages to determine whether said service command message was passed by said Socks server to one of said computers on said open network.

25. The system of claim 24 said response message evaluator determining whether said service command message was executed by said one computer on said open network.

26. The system of claim 25 said response message evaluator storing service indicators indicative of said services which executed said service command messages received at said port addresses.

27. A method for detecting a security vulnerability in an open network comprised of the steps of:
   attempting an Internet Protocol (IP) spoofing attack against a target computer and open network;
   generating a service command message; and
   sending said service command message to said target computer following said IP spoofing attack to determine whether said target computer has been compromised, said service command message generating an indicator of the success of the IP spoofing attack without altering the operational parameters of the target computer.

28. The method of claim 27, wherein said generating service command message step generates one of an rsh and rlogin command.

29. The method of claim 28, wherein said generating step:
   generates an electronic mail message indicative of the success of the IP spoofing attack in response to said service command message.

30. The method of claim 27, further comprising the step of:
   initiating a Telnet session between said target computer and another computer to indicate the success of said IP spoofing attack in response to said service command message.

31. The method of claim 27, further comprising the steps of:
   generating source addresses and destination addresses for said IP spoofing attack; and
   attempting said IP spoofing attack against each said generated destination address by emulating communication from each of said source addresses.

32. A method for generating a service topology map of an open network comprising the steps of:
   generating a communication command initiation message;
   sending said communication command initiation message to a port on a computer on an open network;
   receiving a message from said port in response to said communication initiation message being received at said port; and
   evaluating said message received from said port to determine whether a service is coupled to said port without establishing a communication connection with said port.

33. The method of claim 32, further comprising the step of:
   storing a service indicator to provide a reference that said port has a service coupled thereto which may be accessed from another computer.

34. A method for detecting availability of a service on a port of a computer on an open network comprising the steps of:
   generating a service command message;
   sending said generated service command message to a port of a computer on said open network;
   receiving a message from said port in response to said port receiving said generated service command message; and
   evaluating said message received from said port to determine whether a service coupled to said port executed said service command message, without establishing a communication connection with said ports.

35. The method of claim 34, further comprising the step of:
   storing a service indicator indicative that said service coupled to said port executed said service command message.

36. The method of claim 35, wherein said generating step generates service command messages for different services; and
   said evaluating step determines the type of service coupled to said port which executed said service command message.

37. The method of claim 36, wherein said generating step generates said service command messages for each port of a computer of said open network.

38. The method of claim 34, further comprising the steps of:
   establishing a communication connection with a Socks server;
   requesting said Socks server establish a communication connection with a computer on said open network; and
   said evaluating step determining whether said Socks server is configured to stop said service command message from being sent to said port of said computer of said open network.

39. The method of claim 34, wherein said generating step generates remote procedure call (RPC) service command messages.

40. The method of claim 34, wherein said generating step generates service command messages having predetermined source port addresses.

41. The method of claim 34, wherein said generating step generates source routed service command messages.

* * * * *